United States Patent [19]

Wiley et al.

[11] 3,896,200

[45] July 22, 1975

[54] METHOD OF MOLDING BIAXIALLY ORIENTED HOLLOW ARTICLES

[75] Inventors: Fred E. Wiley, Longmeadow, Mass.; Edward W. Turner, Somers, Conn.

[73] Assignee: Phillips Petroleum Company, Bartlesville, Okla.

[22] Filed: June 11, 1970

[21] Appl. No.: 48,846

Related U.S. Application Data

[63] Continuation of Ser. No. 706,219, Feb. 14, 1968, abandoned, which is a continuation-in-part of Ser. No. 489,934, Sept. 24, 1965, Pat. No. 3,390,426.

[52] U.S. Cl. ..................... 264/89; 264/92; 264/98; 425/DIG. 212; 425/DIG. 216
[51] Int. Cl. ............................................ B29c 17/07
[58] Field of Search ............ 264/90, 92; 425/387 B, 425/326 B, DIG. 212, DIG. 216, 302 B, 296

[56] References Cited
UNITED STATES PATENTS

| | | | |
|---|---|---|---|
| 2,919,462 | 1/1960 | Friden | 264/99 |
| 3,001,239 | 9/1961 | Santelli et al. | 264/98 |
| 3,311,684 | 3/1967 | Heider | 264/98 X |
| 3,347,966 | 10/1967 | Seefluth | 264/94 X |

Primary Examiner—Jan H. Silbaugh

[57] ABSTRACT

A biaxially oriented hollow article is formed by grasping a first end of a hollow parison which has been heated in the solid state to a temperature just below the crystalline melting temperature of the material comprising said parison, grasping the other end of said parison, applying axial tension to said parison and creating a pressure differential between the inner portion and outer portion of said parison so as to expand said parison to fill a mold cavity.

1 Claim, 8 Drawing Figures

PATENTED JUL 22 1975　　　　　　　　　　　　　　　3,896,200

SHEET 1

INVENTORS
E.W. TURNER
F.E. WILEY

BY

ATTORNEYS

INVENTORS
E. W. TURNER
F. E. WILEY

BY

ATTORNEYS

INVENTORS
E.W. TURNER
F.E. WILEY
BY

ATTORNEYS

METHOD OF MOLDING BIAXIALLY ORIENTED HOLLOW ARTICLES

CROSS REFERENCE TO RELATED APPLICATION

This is a continuation of copending application Ser. No. 706,219, filed Feb. 14, 1968, now abandoned, which is a continuation-in-part of application Ser. No. 489,934, filed Sept. 24, 1965, now U.S. Pat. No. 3,390,426.

BACKGROUND OF THE INVENTION

This invention relates to molding hollow articles. In one of its aspects it relates to a method for blow molding or vacuum molding hollow articles, the method comprising extruding a hollow parison, stretching the hollow parison axially before or as it is expanded radially to biaxially orient the article. In another of its aspects it relates to a method of blow molding or vacuum molding an article wherein a portion having a means for receiving a closure member is formed in said hollow article as the hollow article is blow molded. In another of its aspects, the invention relates to a blow molding operation wherein a hollow parison is grasped at one end by a neck and thread forming means, the other end is grasped by a gripped and severing means which seals off the parison at that end, the seal area is pressed with a compressing means, the parison is stretched, a mold is closed around the parison, and the parison is expanded in a radial direction while an axial tension is maintained on the parison. In a more specific aspect of the invention, at least one of the neck and thread forming means and the gripping and severing means withdraw in an axial direction to deform the parison in the axial direction as the parison is molded. In another aspect of the invention, it relates to a method for molding a hollow article wherein there is provided a means for clamping and severing one portion of a hollow parison, a means for providing a differential pressure between the inner portion of said parison and the outer portion of said parison, a retractable mold which is axially longer than said parison, a retractable means for gripping the other end of said parison and forming a threaded neck portion in said parison, and a means for retracting at least one of said clamping means and said neck forming means. In another of its aspects, the invention relates to a method for blow molding a hollow article wherein there is provided six pinch jaws to seal off one end of a hollow open ended heated parison and a means for tamping the inner surface of the parison at the sealed off end to form a compression seal in the bottom of said heated parison.

Blow molded articles are well known in the art. The method is generally used for forming hollow articles such as bottles and jars made of thermoplastic material. The general method is to extrude a thoroughly molten parison, to pinch off one end of the parison while severing or at least substantially severing the same from the extrudate, and applying a differential pressure between the inner and outer portions of the parison to expand the same, generally into a mold. Articles formed by this general method may be circumferentially oriented to some degree and possess slightly improved mechanical properties in that direction, although at the high temperature generally considered essential for extruding and sealing a parison, very little orientation occurs, even in the direction the parison is stretched. The mechanical properties in the axial direction generally do not reflect any improvement attributable to orientation due to the fact that the article is not significantly stretched in the axial direction and also because it is at too high a temperature to be oriented even if it were stretched.

One factor which has tended to preclude fabrication of biaxially oriented bottles has been the fact that the most convenient way to do this would be to fabricate individual open end parison preforms and then reheat them to orientation temperature just prior to the blowing operation. However this necessitates sealing off one end of a parison which is at orientation temperature, a temperature which has been generally considered too low to effect a satisfactory seal or to impart a contour to the neck area.

It has now been discovered that a blow molded article can be biaxially oriented by providing a temperature conditioned parison shorter than a mold into which it is placed, and by stretching the parison axially or providing a constant axial tension on the parison as it is blow molded at orientation temperature to fill the mold.

SUMMARY OF THE INVENTION

It is, therefore, an object of this invention to provide a biaxially oriented hollow article.

It is a further object of this invention to provide a blow molded object of improved strength in the axial direction.

It is a further object of this invention to provide a fast, efficient, method for forming a hollow thermoplastic article with a threaded neck portion.

It is a still further object of this invention to provide a blow molded article from a hollow open ended parison, which article has an improved seal in the area in which the parison has been pinched off.

It is a still further object of this invention to provide a method for sealing a thermoplastic parison while said parison is at orientation temperature.

Other aspects, objects, and the several advantages of this invention are apparent to one skilled in the art from a study of this disclosure, drawings, and the appended claims.

According to the invention, a biaxially oriented hollow article is made by maintaining a constant tension on a hollow parison or by deforming (stretching) the parison in an axial direction before or as it is expanded radially into a mold cavity. Further according to the invention, the parison is gripped at one end by a neck forming means and at the other end by a gripping means which seals it off and substantially severs it. During or prior to the blowing operation, at least one of the neck forming means and the bottom gripping means are withdrawn to provide a tension on the parison.

BRIEF DESCRIPTION OF THE DRAWINGS

In the drawings forming a part hereof, wherein like reference characters represent like parts in the different views.

3

Figure 3:
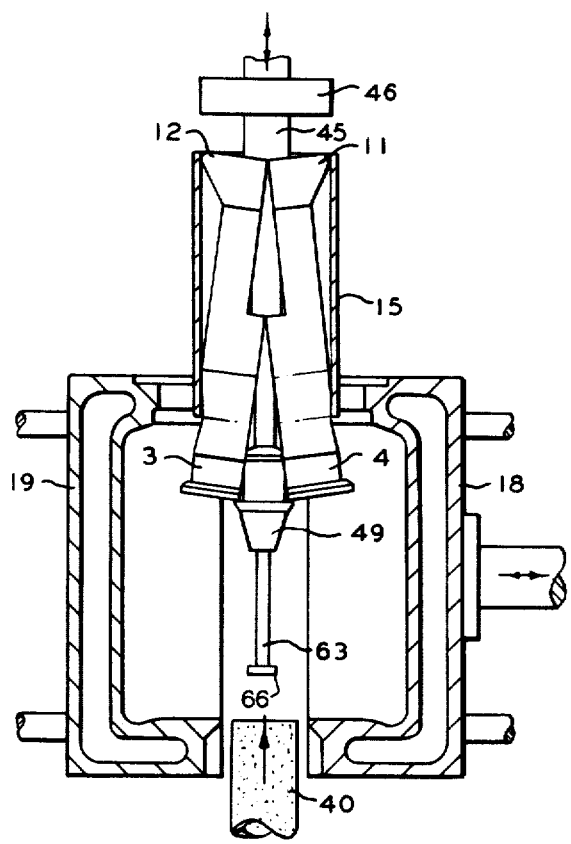
FIG. 3 is a sectional view taken along a vertical plane passing through line 3—3 showing the first step of the process.
Figure 4:
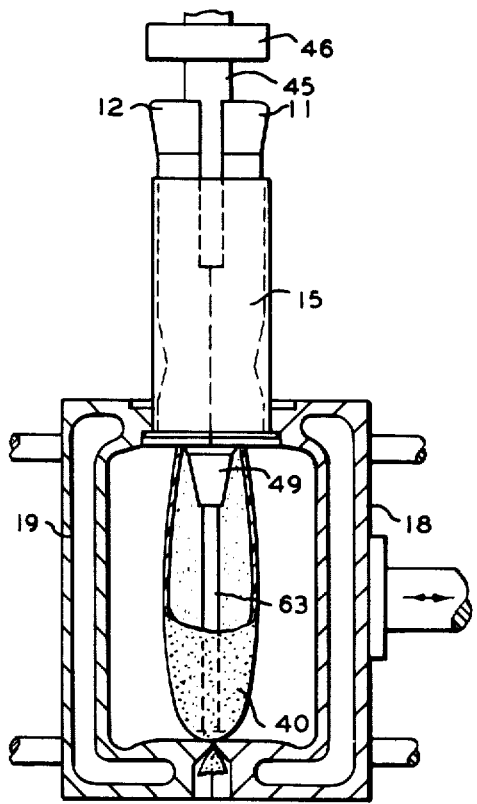

FIG. 4 is a view similar to FIG. 3 at a later stage of the process.

Figure 5:
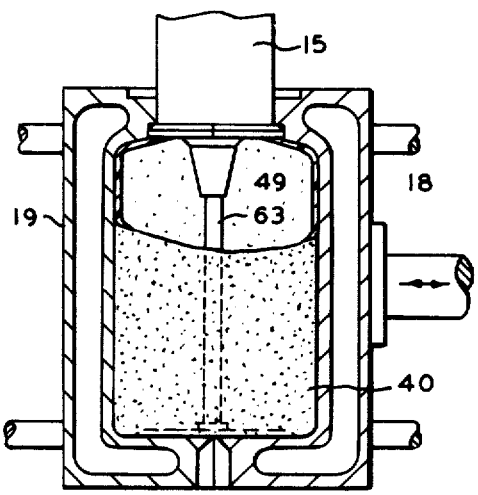

FIG. 5 is a view similar to FIG. 4 at a later stage of the process.

Figure 6:
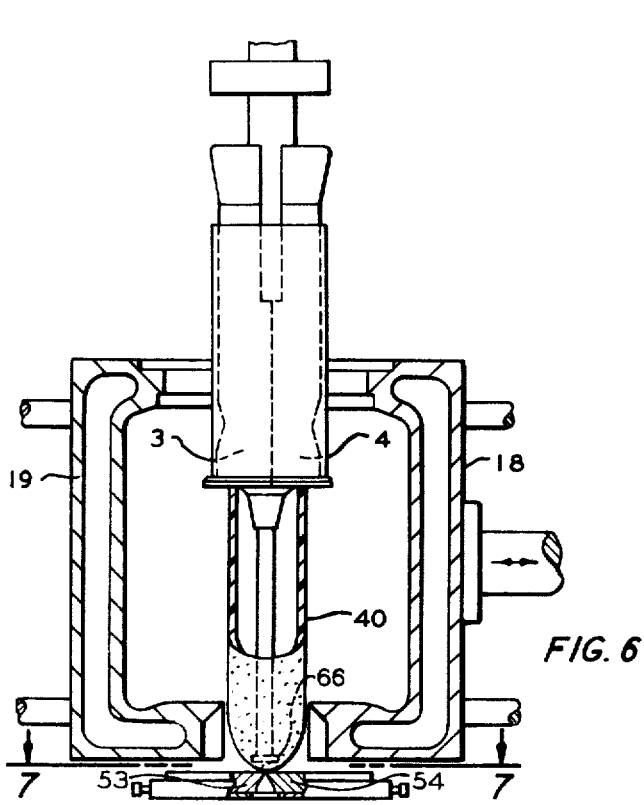

FIG. 6 is a view similar to FIG. 3 showing a modification of the apparatus according to the invention.

Figure 7:
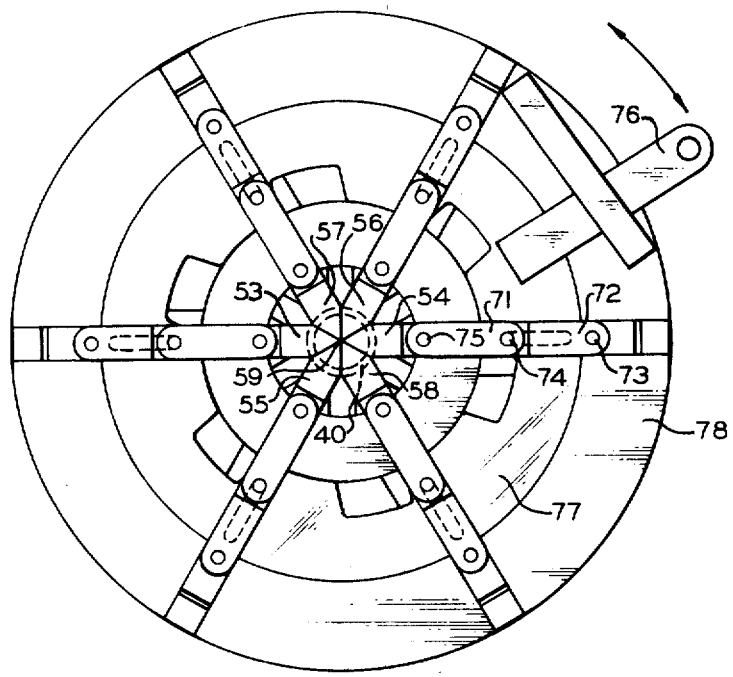

FIG. 7 is a sectional view taken along line 7—7 of FIG. 6 showing the pinch off device.

Figure 8:
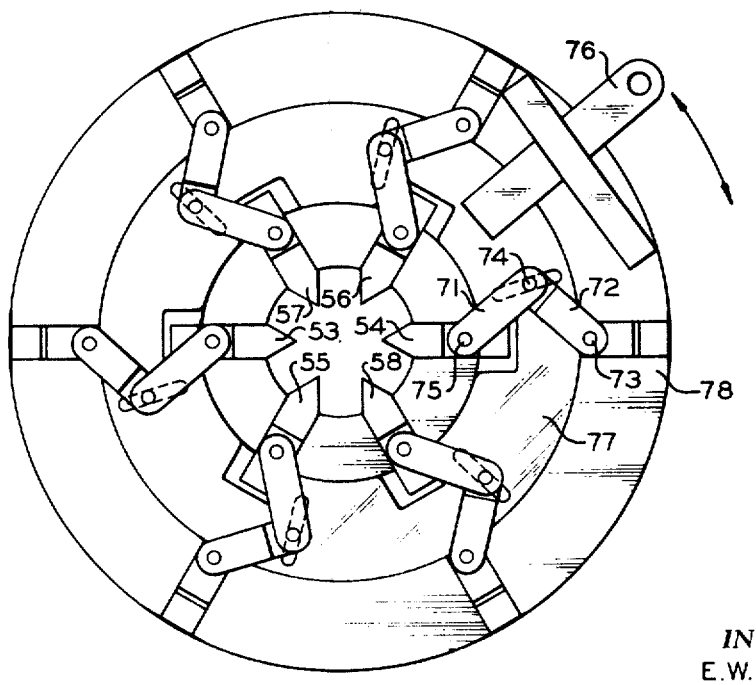

FIG. 8 is a view similar to FIG. 7 showing the pinch off device in the open position.

DESCRIPTION OF THE PREFERRED EMBODIMENTS

Figure 1:
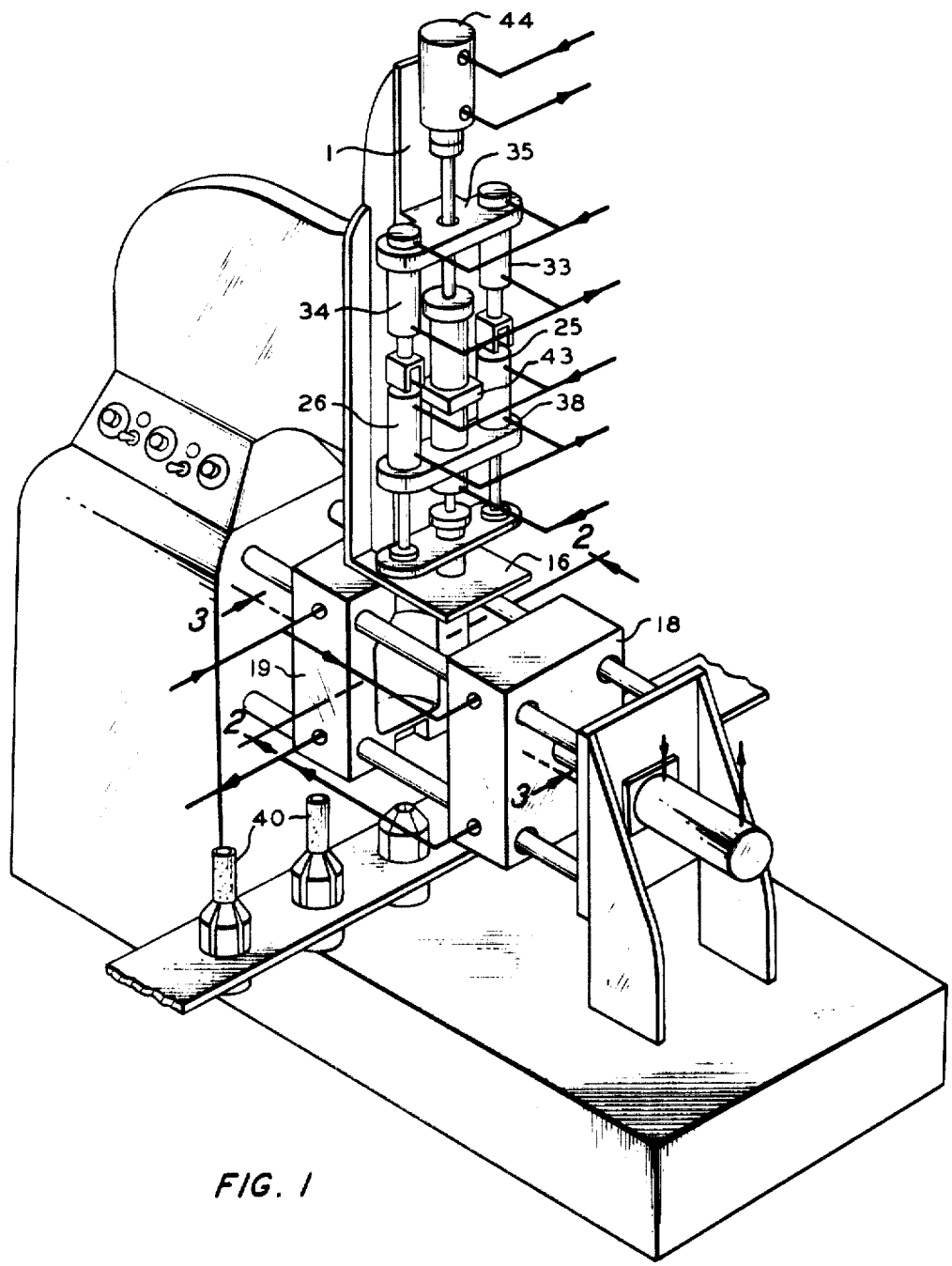
FIG. 1 is an isometric view of an apparatus according to the invention for forming blow molded hollow containers.
Figure 2:
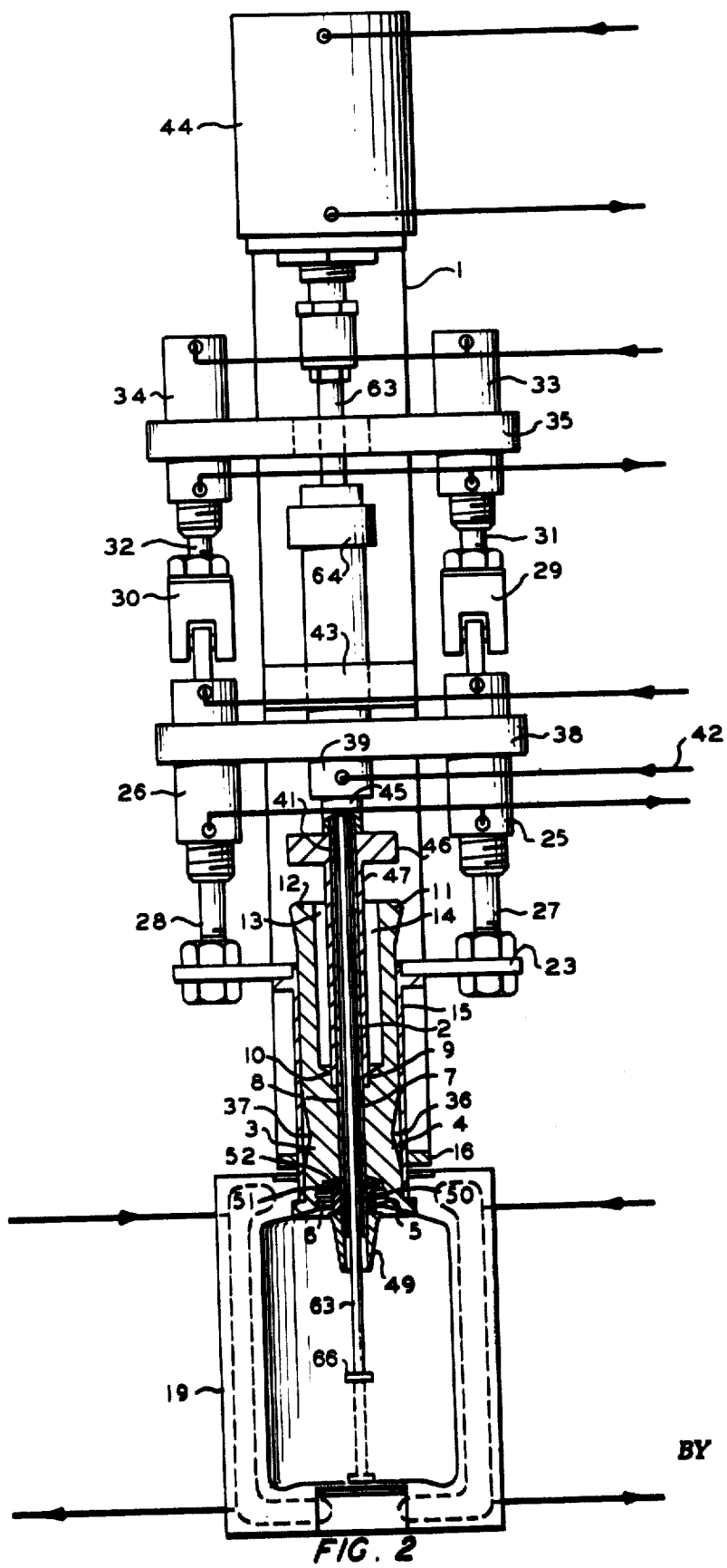
FIG. 2 is a sectional view of the apparatus taken along a vertical plane passing through line 2—2.

Referring now to the drawings, parisons 40 are temperature conditioned and fed in between mold halves 18 and 19. The whole blowing apparatus is supported on frame 1 which can be any suitable structural shape such as an I beam. Air cylinder 44, plate support member 35, guide block 43, and guide member 16 are attached to frame 1. Referring specifically to FIG. 2, movable jaws 3 and 4 are provided with thread forming die 5 and 6. According to the invention, there can be two or more of these movable jaw members 3 and 4. Preferably, there will be three movable jaw members. In the uppermost position as shown in FIG. 2, the lowermost portions of movable members 3 and 4 are flush with the innermost surface of molds 18 and 19. In other words, the lowermost portions of movable jaw members 3 and 4 form a continuous surface with the inner surface of molds 18 and 19. A tapered guide tip 49 is provided on the end of air inlet tube 2 for guiding the parison in place and for keeping the parison walls apart. The middle portion of movable jaw members 3 and 4 are provided on the inner surface 7 and 8 with a groove surface which conforms to the shape of the outer portion of the air inlet tube 2. Members 3 and 4 are recessed at 36 and 37 in the outer central portion. The uppermost portions of movable jaw members 3 and 4 are provided on the inner side with recessed annular portions 13 and 14 and outwardly extending annular portions 11 and 12. It can be seen that unless constrained, the movable jaw members 3 and 4 can pivot around points 9 and 10. Movable members 3 and 4 are retained on the central shaft by cam tube 15 in which members 3 and 4 are adapted to slide axially. Tube 15 is held slidably in place by guide member 16, which is fixed to the frame of the apparatus. Attached to the upper end of tube 15 is plate member 23, which is attached to vertical shafts 27 and 28. In this embodiment, the shafts 27 and 28 are bolted to plate member 23. Air cylinders 25 and 26 activate shafts 27 and 28 in a vertical direction to move cam tube 15 up or down with respect to movable jaws 3 and 4. In so doing, the cam tube causes movable jaws 3 and 4 to open and close by pivoting around pivot points 9 and 10. Air cylinders 25 and 26 are supported by linkages 29 and 30 which in turn are connected to shafts 31 and 32. The entire blowing apparatus is supported by shafts 31 and 32, and moves up and down with vertical movement of shafts 31 and 32. Air cylinders 33 and 34 activate shafts 31 and 32. Plate support member 35 is attached to a rigid frame and supports air cylinders 33 and 34. Block mount 38 is supported by air cylinders 25 and 26. Mount 38 is rigidly attached to guide tube 39 which is slidably attached to the frame by guide block 43. A collar 64 restricts the downward movement of guide tube 39.

A pressure pin assembly consisting of a rod 63 with a tamping foot 66 which extends from the mold cavity through the movable jaw members 3 and 4, through the guide tube 39 and to air cylinder 44 is activated by cylinder 44 to move independently of the rest of the apparatus. Air cylinder 44 is rigidly attached to the frame.

Guide tube 39 also houses air inlet 42 which is connected to a channel 41 which is formed by the annular space between the rod 63 and air inlet tube 2, which is attached to guide tube 39 at the upper end and attached to tapered guide tip 49. Positioned over air inlet tube 2 is spacer 45, collar 46, and spacer-fulcrum tube 47, the lower end of which serves as pivot points for movable jaws 3 and 4.

Tapered guide tip 49 has above it and resting on it rubber compression ring 50, washer 51 and tapered compression washer 52. Rubber compression ring 50 is preferably made from a soft rubbery material which will expand radially when compressed axially. According to a preferred embodiment of the invention, the compression ring 50 will be slightly compressed when the jaws 3 and 4 are in the close position. As can be seen from the drawings, downward movement of the jaws with respect to the tapered guide tip 49 will compress compression member 50 more and cause it to expand radially. Instead of utilizing a compression ring to exert outwardly directed axial pressure from the inside of the parison to cause the upper end to conform to the shape of the thread and neck forming means, tip 49 can have two tapers, a first steep taper to aid in inserting it in the parison and a second shallow taper in an upwardly extending portion of the tip corresponding to compression ring 50. After the jaws close the tapered tip can be moved axially downward into the end of the parison to expand it out into conformity with the thread forming surfaces of jaws 3 and 4.

A hollow tubular parison 40 is normally gripped at the bottom and sealed off with the bottom of the mold halves 18 and 19. In another embodiment of the invention as shown in FIGS. 6, 7, and 8, jaws 53 and 54 which pinch off the parison at the lower end are positioned below mold members 18 and 19. The jaws 53 and 54 are moved together and apart by conventional means such as hydraulic cylinders.

In operation, the movable jaws 3 and 4 are extended downwardly to the lowermost position as shown in FIG. 3 by air cylinders 33 and 34. Air cylinders 25 and 26 actuate shafts 27 and 28 to pull upwardly cam tube 15, causing the cam tube to move upwardly with respect to movable members 3 and 4. This motion causes inward and upward pressure against ends 11 and 12, thus pivoting movable members 3 and 4 about points 9 and 10 so that the lower portions of jaws 3 and 4 will be positioned outwardly and the upper portions will be positioned inwardly. The parison is then inserted into position over a mandrel comprising guide tip 49 and compression ring 50, and against washer 51. Air cylinders 25 and 26 are actuated to move shafts 27 and 28 downwardly with respect to jaws 3 and 4, causing die portions 5 and 6 to close around the upper end of the parison. The mere closing of the jaws 3 and 4 exerts axial pressure on compression ring 50, thus causing it to expand slightly. A further downward movement of tube 15 with respect to jaws 3 and 4 causes ring 50 to be compressed in the axial direction more and expand more in the radial direction. This radial expansion of ring 50 forces the upper end of parison 40 to conform to the shape of the dies 5 and 6. In such a process, the neck or top portion of the article is formed. According to a preferred embodiment of the invention, a bottle with threads on the outer side of the neck is formed.

After the neck portion is formed, mold halves 18 and 19 close to seal, sever and clamp the opposite end of the parison, then air cylinder 44 actuates rod 63 with foot 66 to extend down to the bottom of parison 40 and press it against the bottom of the mold cavity. The pressure of this rod against the bottom of the parison aids in forming the bottom of the article as well as holds the bottom of the parison in the bottom of the mold cavity as the blowing operation takes place. In the event a closed end parison is used, rod 63, with foot 66, can be used to seat the closed end of such a parison against the mold cavity bottom during the blowing operation.

After the rod 63 with foot 66 is seated in the bottom, air cylinders 33 and 34 actuate shafts 31 and 32 to move upwardly block mount 38, guide tube 39, air inlet tube 2, cam tube 15 and jaws 3 and 4 in one continuous motion. This upward motion stretches the parison axially. FIG. 4 shows the condition of the parison and apparatus components at the completion of the above mentioned steps. Air or other suitable blowing fluid is introduced through an inlet 42 and passes through channel 41 into the inside of parison 40, causing it to expand. FIG. 5 shows the completed bottle just after completion and prior to ejection. The blowing operation can take place either during or after the stretching operation.

It is within the scope of the invention to provide vacuum ports in the mold halves to allow vacuum to be drawn between the mold cavity and the outside of the parison in lieu of, or in addition to, forcing air into the inside of the parison. In the vacuum operation, channel 41 could serve as a means for maintaining atmospheric pressure within the parison as it expands. The main object is to introduce a differential pressure between the inside and outside of the parison to allow radial expansion during or after axial stretching.

The combination of stretching and blowing will produce a biaxially oriented object. In a preferred embodiment of the invention, a biaxially oriented blow molded bottle is produced.

After the blowing operation is completed, the mold halves are opened, cam tube 15 is drawn upwardly to open jaws 3 and 4, and rod 63 with foot 66 can be moved slightly downwardly to free the blown object from the mold.

In the embodiment shown in FIGS. 6, 7, and 8, jaws 53 and 54 close off and grip the parison at the lower end after the parison has been inserted and clamped at the top by jaws 3 and 4.

In a preferred embodiment of the invention, jaws 53 and 54 represent two of a group of six such jaws, as shown in FIG. 7 and FIG. 8. The jaws 53, 54, 55, 56, 57 and 58 are arranged in a plane perpendicular to the longitudinal axis of the parison 40. Each jaw reciprocates axially in the plane toward and away from point 59, which, preferably, is the central longitudinal axis of parison 40. Each jaw is preferably separated by an angle of 60° around the point 59 in the plane of the jaws. Each jaw contains a 60° included angle tip which when coacting with the other jaws functions to seal off parison 40 so that all points of the seal area tend to be drawn toward a point at 59. The jaws need not be disposed at angles of 60° from each other, but may be at any angle whatsoever so long as the jaws coact to pinch and/or seal off parison 40 at a point. Further, it is obvious that a greater or lesser number of jaws can be provided without departing from the scope of the invention. The drawing of the parison in the seal area toward a point in combination with the tamping by foot 66 has been found to increase the impact strength of the blown bottles due to an improved seal at the bottom.

In the embodiment shown in FIGS. 7 and 8, the jaws are actuated by a three pin toggle arrangement attached to each jaw. Toggle member 71 is pivotably attached at 75 to jaw 54 and is pivotably attached to toggle member 72 and ring member 77 at pin 74. Toggle member 72 is pivotably attached to fixed structure 78 at 73. An actuating bar, member 76, is fixedly attached to ring member 77, which is rotatable about point 59 with respect to the fixed structure 78.

In operation, actuating bar member 76 is reciprocated in the direction indicated by the arrow, whereupon ring member 77 rotates about point 59. This rotary movement causes toggle members 71 and 72 to be angularly displaced, thus pulling jaw 54 away from central point 59. The action is reversed to cause jaw 54 to approach central point 59.

Each of the jaws will have a mechanism similar to the above described toggle arrangement to actuate each jaw to operate in unison with the other jaw. Other means, such as hydraulic cylinders, can also be used to actuate the jaws in unison.

In the actual molding operation, the jaws are in the retracted position as the parison is inserted into the opening between them. When the parison is in position, the thread-forming dies close over the upper portion of the parison as hereinbefore described. The parison is then pinched and sealed at the lower portion thereof by the jaws 53, 54, 55, 56, 57 and 58 which apply pressure readily inward from a plurality of directions toward a central point.

Rod 63 with foot 66 presses the closed off area in the bottom of the parison against the face of jaws 53, 54, 55, 56, 57 and 58. The jaws 3 and 4 are raised to stretch the parison after jaws 53-58 are closed further to completely pinch off or sever the parison. While the parison can be completely pinched off or severed initially, an exceptionally good seal is obtained by closing the jaws only enough to pinch shut the parison, pressing against the thus sealed off area from the inside, thereafter completing the closing of the jaws to sever the parison after which the parison is stretched longitudinally. By means of this sequence of steps, flow of the essentially solid polymer is effected at the seal area since the jaws are not completely closed at the time pressure is exerted from the inside. However, the parison is still severed before stretching as the additional time taken for stretching allows the polymer to cool to a point even further below the crystalline melting point at which point it would be very difficult to sever the parison with a simple pinching action. Next, jaws 3 and 4 and foot 66 are raised to position the parison between the mold halves 18 and 19 and the mold halves are closed. The rod 63 and foot 66 is actuated to press the bottom of the parison against the bottom of the mold and the jaws 3 and 4 are raised to their final position in the top of the mold before or as the parison is blown. The foot can cool the parison in the seal area so that deformation does not take place in the seal area as the parison is longitudinally stretched.

In carrying out the invention, it is desirable to maintain a ratio of axial expansion to circumferential expansion in the range of about 1:4 to 2:1, preferably in the range of 1:2 to 1:1.

The circumferential expansion ratio should be in the range of 2:1 to 10:1.

The axial expansion ratio should be in the range of at least 1:1 to 8:1, preferably 1.1:1 to 8:1, more preferably 1.5:1 to 2.5:1. By expansion ratio is meant the ratio of the length of the portion being stretched (i.e. the portion of the parison between the gripping means) after stretching to its length before stretching. A ratio of 1:1 therefore indicates no affirmative stretching although some biaxial orientation can be achieved due to the longitudinal component of the stretching as the temperature conditioned parison is blown.

It has been found that by stretching the parison axially as it is blown and expanded circumferentially, the blowing time, and thus the residence time, of the parison in the blow mold can be decreased manyfold. For example, bottles, drawn axially while being blown, could be blown at an air introduction rate of 20–30 CFM while bottles blown with no axial draw were blown at the rate of 1 CFM. It has been found that in all embodiments of this invention drastically reduced cycle times are possible relative to the hot blown methods of the prior art because the thermoplastic material is at a temperature just below its crystalline melting point and thus almost immediately on being forced into conformity with the mold it is fully self-supporting. Cycle times as low as 6 seconds per bottle per mold or even lower are possible.

The parisons used in the apparatus of the invention were preformed and preheated to a temperature just below the crystalline melt temperature of the material. A temperature of 1° to 50°, preferably 5° to 30° F., below the crystalline melt temperature of the resin is a suitable orientation temperature. The suitable temperature for polypropylene resins (which is the most preferred polymer because of the remarkable improvement in strength and clarity achieved on orientation) would be in the range of 300°–350° F., and preferably in the range of 320°–340° F.

Other at least partially crystalline thermoplastic polymers suitable for use in this invention include polymers of at least one mono-1-olefin having from 2 to 8 carbon atoms per molecule, polyvinyl chloride, and the like, preferably polymers and copolymers of ethylene, propylene, and 1-butene.

The crystalline melt temperature can be determined by placing a film of polymer on a slide under a heated, polarizing microscope and slowly heating said film until the last birefringence under crossed polaroids disappears. This point is taken as the crystalline melting point. The parisons can be formed initially as closed end preforms or can simply be cut from a long section of tubular material.

EXAMPLE I

A 0.91 density polypropylene having a melt flow of 1.05 (ASTM D 1238-57T Condition L) is formed into a 0.87 inch diameter tube 3¼ inches long and having a wall thickness of 0.12 inch over most of its length. The end of this tube on which the threads are to be formed has a wall thickness of 0.09 inch for a distance of 0.5 inch from the end. This tube is inserted into an electrically heated aluminum block and heated to about 324° F. It is then removed from the aluminum block and inserted into position over the guide tip and compression ring of a machine similar to that shown in FIG. 2. The three thread forming jaws are closed, thus forming the threads and clamping the top of the parison. The six movable jaws are then closed, sealing off the bottom end of the parison, then a stamper foot compresses the seal. Next, the six jaws close further, completely severing the bottom of the parison, and the thread former is raised to stretch the parison to approximately twice its original length. The parison is held in this stretched condition and moved between the mold halves, they are closed about the parison, and it is blown to the shape of the mold cavity. The mold is then opened, the neck unclamped, and the bottle removed. A 10 ounce capacity oriented polypropylene bottle cylindrically shaped, having a high degree of clarity, results. A drop test consisting of dropping the bottle full of water at 54° F. from a height of 5 feet, was performed on the bottle. No failure resulted from the drop test.

EXAMPLE II

An unpigmented (natural color) polypropylene resin having a density (ASTM D 1505-60T) of about 0.905 and a melt flow (ASTM D 1238-57T Condition L) of about 0.95 was formed into a 0.865 inch outside diameter tube 3 inches long with a wall thickness of 0.122 inch. The tube which was initially at room temperature was inserted into a hole of slightly greater diameter in a heated aluminum block maintained at a temperature of about 325° F. and heated for 6 minutes. The tube or parison was then removed from the block and one end inserted into position over a tapered Teflon plug of a machine similar to that shown in FIG. 2 having three thread forming jaws. The jaws were closed and the plug moved downward to form the threads in about the first half inch of this end of the tube. An end closing and severing device similar to that shown in FIGS. 7 and 8 was then partially closed on the parison about one-half inch from the opposite end to close and seal this end. A stomper foot similar to that shown in FIG. 2 was then pressed against this sealed off area of the parison with sufficient pressure to cause some of the plastic to flow radially outward from beneath the foot. The six jaws were then moved further radially inward to completely sever the end or tail of the parison from the remainder of the parison. While the stomper foot held the end of the parison against the faces of the pinch blades the thread forming head which grasps the other end of the parison was moved upward to stretch the portion of the parison between the stomper foot and thread forming head to approximately 2½ times its original length. The parison was maintained in this stretched position by the stomper foot and thread former while it was moved from the face of the pinch blades to between two bottle mold platens the length of the mold cavity being approximately the same as the length of the stretched portion of the parison. The mold platens were closed about the thread forming jaws so the lower face of the jaws formed a portion of the mold in the area of the shoulders of the bottle and blowing air at about 150 psig was admitted to the inside of the parison to expand it into contact with the mold wall. The mold was cooled by circulating water at about 55° F. The air pressure in the bottle was then reduced to approximately atmospheric pressure. The mold was then opened after being closed a total time of about 5 seconds, the stomper foot was retracted, the thread forming compression ring relaxed, the thread forming jaws opened and the bottle fell freely from the thread forming head. The bottle which was generally cylindrical in shape and about 2¼ inches in diameter with a wall thickness of about 0.01 inch held approximately 10 ounces of water and was extremely clear approaching the clarity of glass. The total cycle time was about 7½ seconds.

It is within the scope of the invention to provide, in lieu of the pinching off means as shown in FIGS. 6, 7, and 8, a pinching means which can extend into the mold cavity in a similar manner as the thread and neck forming means. This alternate type of pinching means can seal off the lower end of the parison and be retracted flush with the mold walls to axially stretch the parison prior to or during the blowing operation.

While the invention has been described in detail for the purpose of illustration, it is not to be construed as limited whereby but is intended to cover all changes and modifications within the spirit and scope thereof.

We claim:

1. A method for blow molding a biaxially oriented hollow article comprising: grasping a first end of a preformed hollow parison which has been heated in the solid state to a temperature between 1° and 50° F. below the crystalline melt temperature of the material comprising said parison; applying pressure radially inward from a plurality of directions toward a central point on a second end of said parison so as to effect a seal without severing said parison at said second end; applying pressure against said thus sealed area from inside said parison; thereafter severing said parison by further application of said inwardly directed pressure; applying axial tension to said parison to stretch said parison; closing a mold cavity around said parison; and creating a pressure differential between the inner portion and outer portion of said parison so that said parison will expand to fill said mold.

* * * * *